United States Patent [19]
Wilkinson

[11] Patent Number: 5,812,125
[45] Date of Patent: *Sep. 22, 1998

[54] METHOD AND APPARATUS FOR SELECTIVELY GENERATING DISPLAY IMAGES

[75] Inventor: Jeffrey Allen Wilkinson, Cedar Park, Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 497,304

[22] Filed: Jun. 30, 1995

[51] Int. Cl.$^6$ .................................................. H04N 7/14
[52] U.S. Cl. .................................................. 345/330
[58] Field of Search .................................... 395/330, 331, 395/332; 345/326, 329, 330, 331, 332, 335, 340, 342

[56] References Cited

U.S. PATENT DOCUMENTS

| | | | |
|---|---|---|---|
| 4,953,159 | 8/1990 | Hayden et al. | 395/330 X |
| 4,992,866 | 2/1991 | Morgan | 395/356 |
| 5,233,687 | 8/1993 | Henderson, Jr. et al. | 395/356 |
| 5,235,680 | 8/1993 | Bijnagte | 348/159 |
| 5,257,306 | 10/1993 | Watanabe | 395/330 X |
| 5,309,555 | 5/1994 | Akins et al. | 395/330 |
| 5,321,838 | 6/1994 | Hensley et al. | 395/701 |
| 5,327,529 | 7/1994 | Fults et al. | 395/335 |
| 5,375,068 | 12/1994 | Palmer et al. | 395/330 |
| 5,491,743 | 2/1996 | Shiio et al. | 395/330 X |

*Primary Examiner*—Phu K. Nguyen
*Assistant Examiner*—Cliff N. Vo
*Attorney, Agent, or Firm*—Volel Emile; Paul S. Drake

[57] ABSTRACT

An apparatus and method for selecting portions of a displayed image for remote display including displaying a first image, selecting a subset of the displayed first image, and communicating the selected portion of the first image for display on a remote display.

20 Claims, 5 Drawing Sheets

METHOD AND APPARATUS FOR SELECTIVELY GENERATING DISPLAY IMAGES

TECHNICAL FIELD

The present invention relates generally to computer graphics systems and more particularly to a method and apparatus for a user interface to selectively generate display images for use on a remote display.

BACKGROUND ART

Recent advances in data transmission across local area networks or across networks and the rapid processing of such data has provided the capability of multiple users sharing multimedia data. This has greatly enhanced the capability of multiple users viewing multimedia data such as in videoconferencing.

In videoconferencing, typically a local user has a local camera and a local display. The camera may possibly include a viewfinder to view the image captured by the local camera. In other types of systems, the local display may be used for viewing the output of the local camera in a viewfinder window. The local display is also used for viewing, in a separate window if a viewfinder window is displayed, an image captured by the other user's remote camera. The local user then adjusts the local camera and views the results of adjusting the local camera in the viewfinder or viewfinder window to determine what the remote user views on a remote display. That is, the remote display displays the same image that is displayed on the viewfinder or viewfinder window because both displays share the same video signal or source image video data. This allows the local user to easily control what the remote user views on the remote display. However, the local user has a limited ability to adjust the video signal, typically limited to moving or adjusting the camera to modify the camera output. The remote user may decide to place the received data in a window on the remote display, thereby allowing the remote user some flexibility in their use of the received data.

DISCLOSURE OF THE INVENTION

The present invention includes an apparatus and method for selecting portions of a displayed image for remote display including displaying a first image, selecting a subset of the displayed first image, and communicating the selected portion of the first image for display on a remote display.

A further understanding of the nature and advantages of the present invention may be realized by reference to the remaining portions of the specification and the drawings.

BEST MODE FOR CARRYING OUT THE INVENTION

This disclosure describes an improved method and apparatus for a user interface for allowing a user to selectively generate display images for a remote user. In the preferred embodiment, the local user has a local display that may include local camera output in a viewfinder window, but that may also include any other types of data the local user desires.

For example, the local display may have the local camera output displayed in a viewfinder window with other types of data such as graphical data or other types of application output (i.e. word processing, spreadsheet, etc.) in other windows on the local display. The user then moves a view box around the local display. As a result, the remote user views on the remote display whatever is within the view box on the local display. As a further result, the local user may use the view box to select that the remote user will see only a portion of the video image displayed in the viewfinder window on the local display.

The local user may also use the view box to select that the remote user will see the output of another application such as a spreadsheet. Furthermore, the local user may use the view box to select that the remote user will see portions of the video image and the spreadsheet application output at the same time. As a result, the local user has the flexibility to easily tailor what the remote user views on the remote display.

Figure 1:
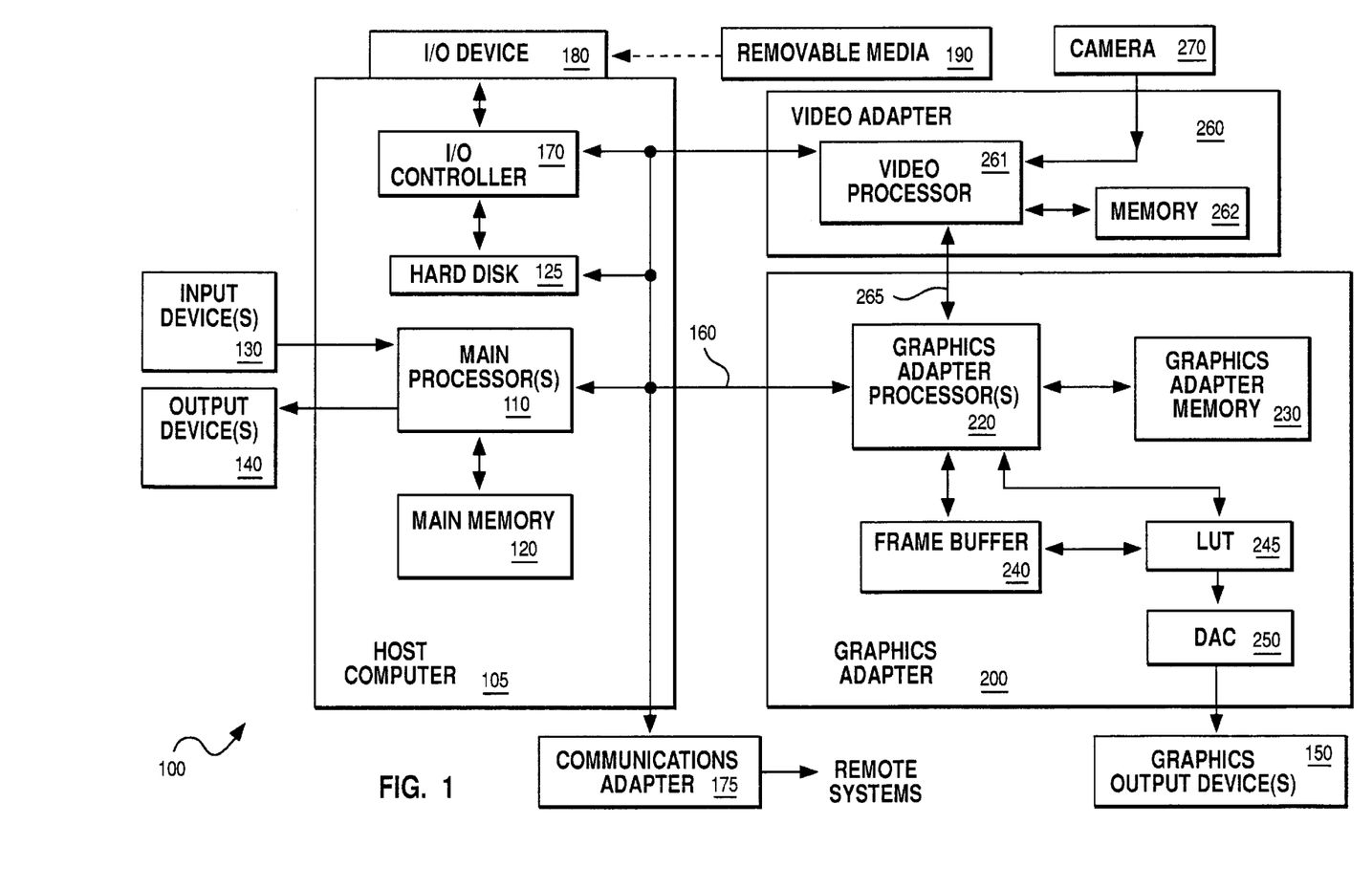
FIG. 1 is a diagram of a typical digital computer utilized by a preferred embodiment of the invention.

FIG. 1 is a block diagram of a typical digital computer 100 utilized by a preferred embodiment of the invention. The computer includes main processor(s) 110 coupled to a memory 120 and a hard disk 125 in computer box 105 with input device(s) 130 and output device(s) 140 attached. Main processor(s) 110 may include a single processor or multiple processors. Input device(s) 130 may include a keyboard, mouse, tablet or other types of input devices. Output device (s) 140 may include a text monitor, plotter or other types of output devices. Computer readable removable media 190, such as a magnetic diskette or a compact disc, may be inserted into an input/output device 180, such as a disk drive or a CD-ROM (compact disc - read only memory) drive. Data is read from or written to the removable media by the I/O device under the control of the I/O device controller 170. The I/O device controller communicates with the main processor through across bus 160. Main memory 120, hard disk 125 and removable media 190 are all referred to as memory for storing data for processing by main processor(s) 110. Communications adapter 175 is also coupled to the main processor 110 across bus 160. Communications adapter is used to communicate information between the main processor or any of the other elements on bus 160 with external systems across and LAN or telephone or other telecommunications paths. This communicated information may be simple data files or may be more complex multimedia and/or video signals.

The main processor may also be coupled to graphics output device(s) 150 such as a graphics display through a graphics adapter 200. Graphics adapter 200 receives instructions regarding graphics from main processor(s) 110 on bus 160. The graphics adapter then executes those instructions with graphics adapter processor(s) 220 coupled to a graphics adapter memory 230. The graphics processors in the graphics adapter then execute those instructions and updates frame buffer(s) 240 based on those instructions. Graphics processors 220 may be a pipeline of processors in series, a set of parallel processors, or some combination thereof, where each processor may handle a portion of a task to be completed. Graphic processors 220 may also include specialized rendering hardware for rendering specific types of primitives. Graphics memory 230 is used by the graphics processor(s) to store information being processed, such as received object data, intermediate calculated data (such as a stencil buffer or partially rendered object data), and completed data being loaded into the frame buffer 240. Frame buffer(s) 240 includes data for every pixel to be displayed on the graphics output device. A RAMDAC (random access memory digital-to-analog converter) 250 converts the digital data stored in the frame buffers into RGB signals to be provided to the graphics display 150 thereby rendering the desired graphics output from the main processor.

The main processor and the graphics adapter may also be coupled to video adapter 260. The video adapter has a video processor 261 for processing video data and a memory 262 for storing data including video data. The video processor is coupled to camera 270 or some other type of video signal source (i.e. a video cassette recorder or the like) for receiving video signals. The main processor is coupled to the video processor through bus 160. The graphics adapter is also coupled to the video processor 261 through bus 160 or through a separate high speed mezzanine bus 265. As a result of these connections, the output of camera 270 is available to main processor 110, graphics adapter 200, or other remote systems across communications adapter 175. A remote system is another computer system in a different physical location from computer 100 (although possibly in the same room) with a separate main processor for processing data. The computer 100 may also be used to describe such a remote system.

In an alternative embodiment, the graphics adapter may include a video processor and video memory within the graphics adapter such that the adapter is a video/graphics adapter. However, such an embodiment could easily incorporate the present invention described herein.

Figure 2:
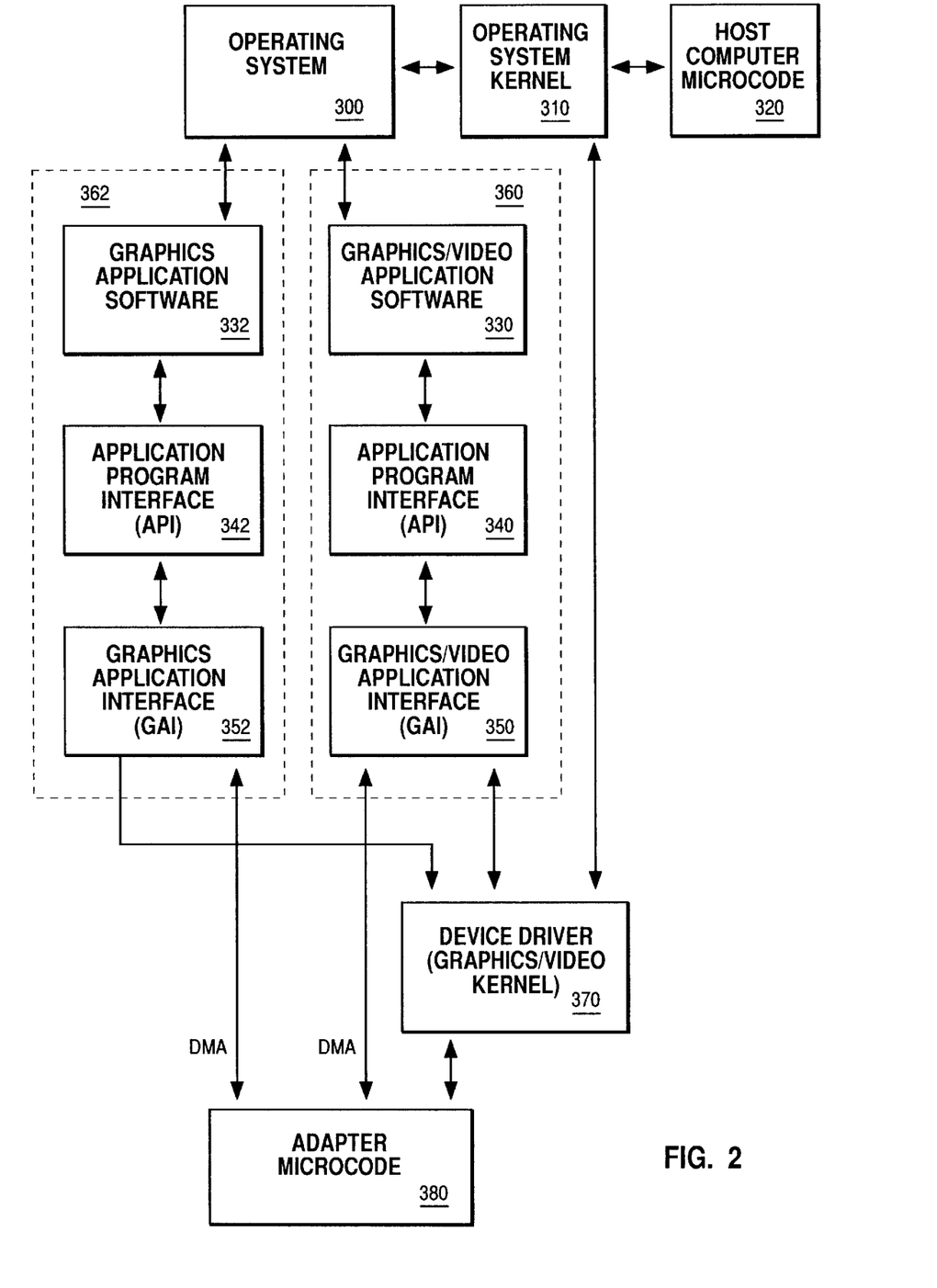
FIG. 2 is a block diagram illustrating the layers of code typically utilized by the host computer and graphics adapter to perform graphics functions.

FIG. 2 is a block diagram illustrating the layers of code typically utilized by the host computer and graphics or graphics adapter to perform graphics functions and may also be used with the video adapter or with a video/graphics adapter to perform video operations. An operating system 300 such as UNIX provides the primary control of the host computer. Coupled to the operating system is an operating system kernel 310 which provides the hardware intensive tasks for the operating system. The operating system kernel communicates directly with the host computer microcode 320. The host computer microcode is the primary instruction set executed by the host computer processor. Coupled to the operating system 300 are graphics application 330 and graphics and/or video application 332. Video applications may be organized similar to graphics applications, particularly when used with a combination graphics/video adapter. This graphics application software can include software packages such as Silicon Graphic's GL, IBM's graPHIGS, MIT's PEX, etc. This software provides the primary functions of two dimensional or three dimensional graphics. Graphics application 330 and graphics/video application 332 are coupled to graphics and/or video application API (application program interface) 340 and 342, respectively. The API provides many of the computationally intensive tasks for the graphics application and provides an interface between the application software and software closer to the graphics and video hardware such as a device driver for the graphics or video adapter. For example, API 340 and 342 may communicate with a GAI (graphics and/or video application interface) 350 and 352, respectively. The GAI provides an interface between the application API and a graphics adapter device driver 370. In some graphics systems, the API also performs the function of the GAI.

The graphics application, API, and GAI are considered by the operating system and the device driver to be a single process. That is, applications 330 and 332, API 340 and 342, and GAI 350 and 352 are considered by operating system 300 and device driver 370 to be processes 360 and 362, respectively. The processes are identified by the operating system and the device driver by a process identifier (PID) that is assigned to the process by the operating system kernel. Processes 360 and 362 may use the same code that is being executed twice simultaneously, such as two executions of a program in two separate windows. The PID is used to distinguish the separate executions of the same code.

The device driver is a graphics/video kernel which is an extension of the operating system kernel 310. The graphics/video kernel communicates directly with microcode of the graphics and/or video adapter 380. In many graphics systems, the GAI, or the API if no GAI layer is used, may request direct access from the GAI or API to the adapter microcode by sending an initial request instruction to the device driver. In addition, many graphics and/or video systems also allow the adapter microcode to request direct access from the adapter microcode to the GAI or API if no GAI is used by sending an initial request instruction to the device driver. Both processes will hereinafter be referred to as direct memory access (DMA). DMA is typically used when transferring large blocks of data. DMA provides for a quicker transmission of data between the host computer and the adapter by eliminating the need to go through the display driver other than the initial request for the device driver to set up the DMA. In some cases, the adapter microcode utilizes context switching which allows the adapter microcode to replace the current attributes being utilized by the adapter microcode. Context switching is used when the adapter microcode is to receive an instruction from a graphics application that utilizes different attributes than the adapted microcode is currently using. The context switch is typically initiated by the device driver which recognizes the attribute changes.

Blocks 300–340 are software code layers that are typically independent of the type of graphics and/or video adapter being utilized. Blocks 350–380 are software code layers that are typically dependent upon the type of graphics and/or video adapter being utilized. For example, if a different graphics adapter were to be used by the graphics application software, then a new GAI, graphics kernel and adapter microcode would be needed. In addition, blocks 300–370 typically reside on and are executed by the host computer. However, the adapter microcode 380 typically resides on and is executed by the graphics and/or video adapter. However, in some cases, the adapter microcode is loaded into the graphics or video adapter by the host computer during initialization of the graphics and/or video adapter.

In typical graphics systems, the user instructs the graphics application to construct an image from a two or three dimensional model. The user first selects the location and type of light sources. The user then instructs the application software to build the desired model from a set of predefined or user defined objects. Each object may include one or more coplanar drawing primitives describing the object. For example, a set of drawing primitives such as many triangles may be used to define the surface of an object. The user then provides a perspective in a window to view the model, thereby defining the desired image. The application software then starts the rendering of the image from the model by sending the drawing primitives describing the objects to the adapter microcode through the API, the GAI, and then the device driver unless DMA is used. The adapter microcode then renders the image on the graphics display by clipping (i.e. not using) those drawing primitives not visible in the window and the adapter microcode breaks each remaining drawing primitive into visible pixels from the perspective given by the user. The pixels are then loaded into the frame buffer, often with the use of a depth buffer in the case of a three dimensional model. This step is very computationally intensive due to the number of drawing primitives, variables, and pixels involved. The resulting image stored in the frame buffer and displayed on the graphics display typically does not carry the original information such as which drawing primitive or object the pixel was derived from. As a result, the image may need to be rerendered in part or in whole if the window, the user perspective, the model, the lighting, etc. are modified.

In typical video systems, the video adapter may receive a video signal directly through an input port on the video adapter. In addition the video adapter may receive a video signal through the communications adapter or from the main processor (such as from a previously recorded video stored in main memory). The signal may be analog or digital. The video adapter may include an analog to digital converter to digitize the video signal. The digitized video signal may then be scaled or converted by a video engine or processor for providing the video images to be displayed. These video images are then passed to the graphics processor for storage in the appropriate location in the frame buffer.

The techniques of the present invention could be utilized in many locations such as the video adapter microcode which is close to the graphics adapter frame buffer. This approach would also be relatively quick and fairly easy to implement but would limit the flexibility of the system and the use of certain possible efficiencies such as using the main processor to send video data directly from the video adapter through the communications adapter. In addition, the present invention could be applied in video application software wherein the image is also stored in system memory either prior to the image being rendered or subsequently by the video adapter passing the data back up to the video application software. This approach would probably be slower but would allow for utilization of this technique on preexisting video adapters and allow coordination with the main processor for flexibility and possible increased efficiencies. The present invention could also be implemented in hardware in the video adapter processor. This approach is extremely quick but may necessitate specialized hardware. As would be obvious to one of ordinary skill in the art, the present invention could be applied in many other locations within the host computer or video/graphics adapters.

Figure 3A:
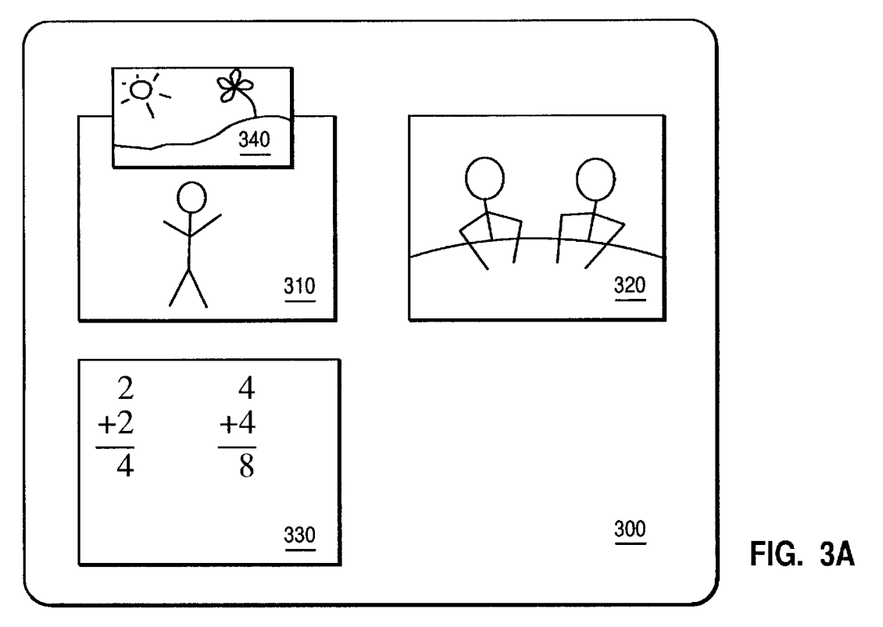
FIG. 3A is an illustration of a display 300 with four separate windows.

FIG. 3A is an illustration of a display 300 with windows 310, 320, 330 and 340. Window 310 shows the output from a local camera and illustrates a person standing in a room. Window 320 shows the output being received from a remote user's camera and illustrates two persons sitting at a table. Window 330 illustrates the output of an application program such as a spreadsheet. Window 340 is an graphics application output window and includes certain desired graphics output such as, in this case, landscape. It is apparent from the display that window 340 overlies a portion of window 310 such that not all of the video output from the camera is displayed in window 310 due to the overlapping window 340.

Figure 3B:
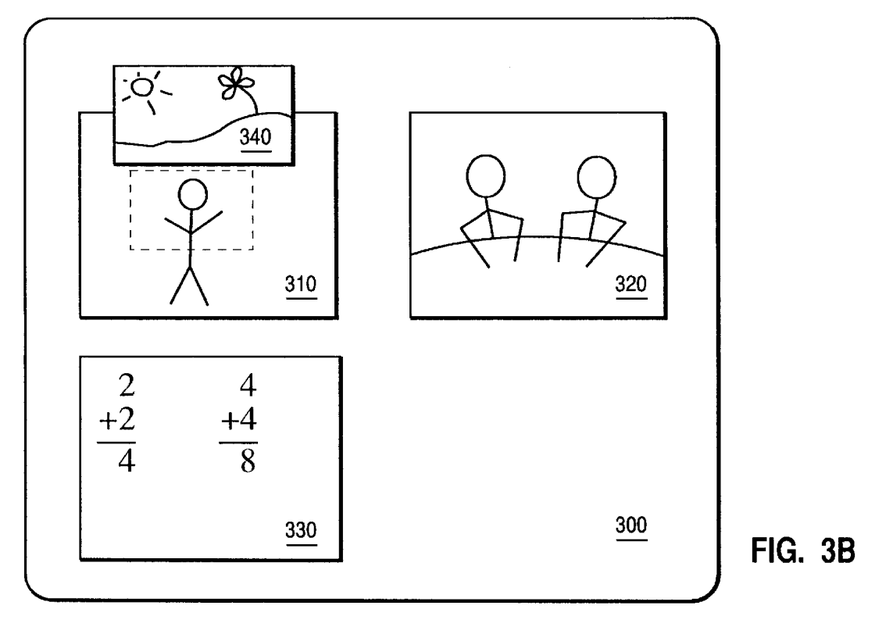
FIG. 3B is a illustration of the display of FIG. 3A with a view box around the upper torso and head of a person in the image of a window.

FIG. 3B is a illustration of the display of FIG. 3A with a view box around the upper torso and head of a person in the image of window 310. As result of the view box being placed in this position, the remote user only sees the upper torso and head of the person in the image. In addition, this portion of the image may be scaled (magnified or shrunk) so that the remote user receives an appropriate number of pixels for display on the remote display.

Figure 3C:
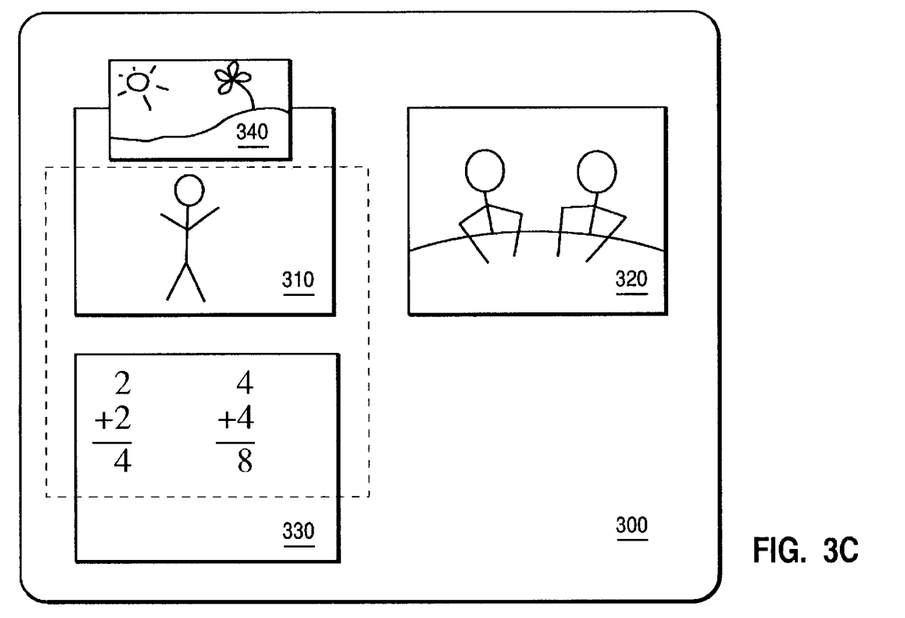
FIG. 3C is an illustration of the display in FIG. 3A with the view box being located over both a portion of the video image and a portion of the spreadsheet image.

FIG. 3C is an illustration of the display in FIG. 3A with the view box being located over both a portion of the video image and a portion of the spreadsheet image. As result, the remote user sees exactly what is within the view box including the desired portion of the video image and a portion of the spreadsheet.

Figure 3D:
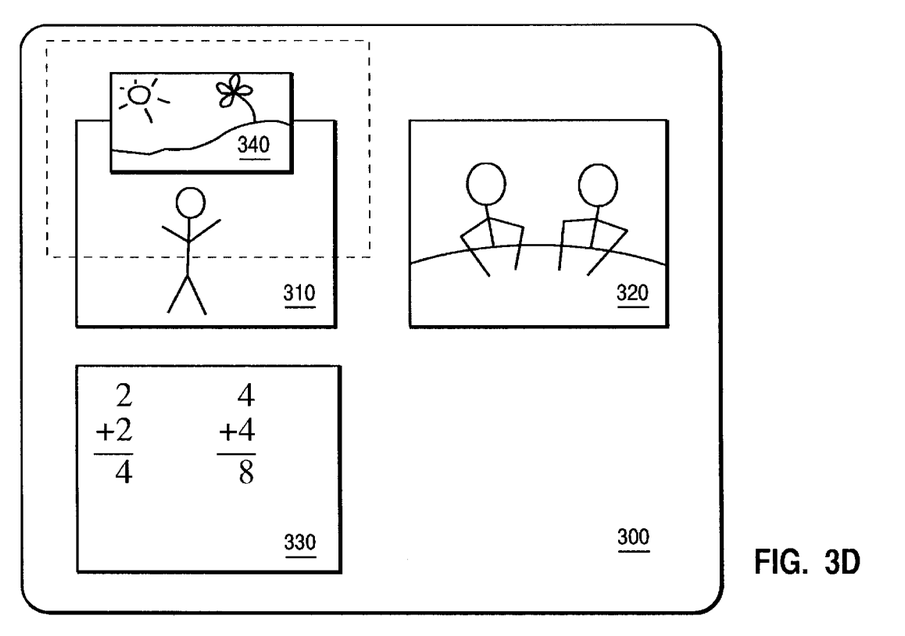
FIG. 3D is an illustration of the display of FIG. 3A where the view has been located over both a portion of the video image and all of a window.

FIG. 3D is an illustration of the display of FIG. 3A where the view has been located over both a portion of the video image and all of window 340. Again, the remote user views whatever is within the view box. Window 340 may also contain other types of information such as a whiteboard which has input from either the local or the remote user.

Figure 4:
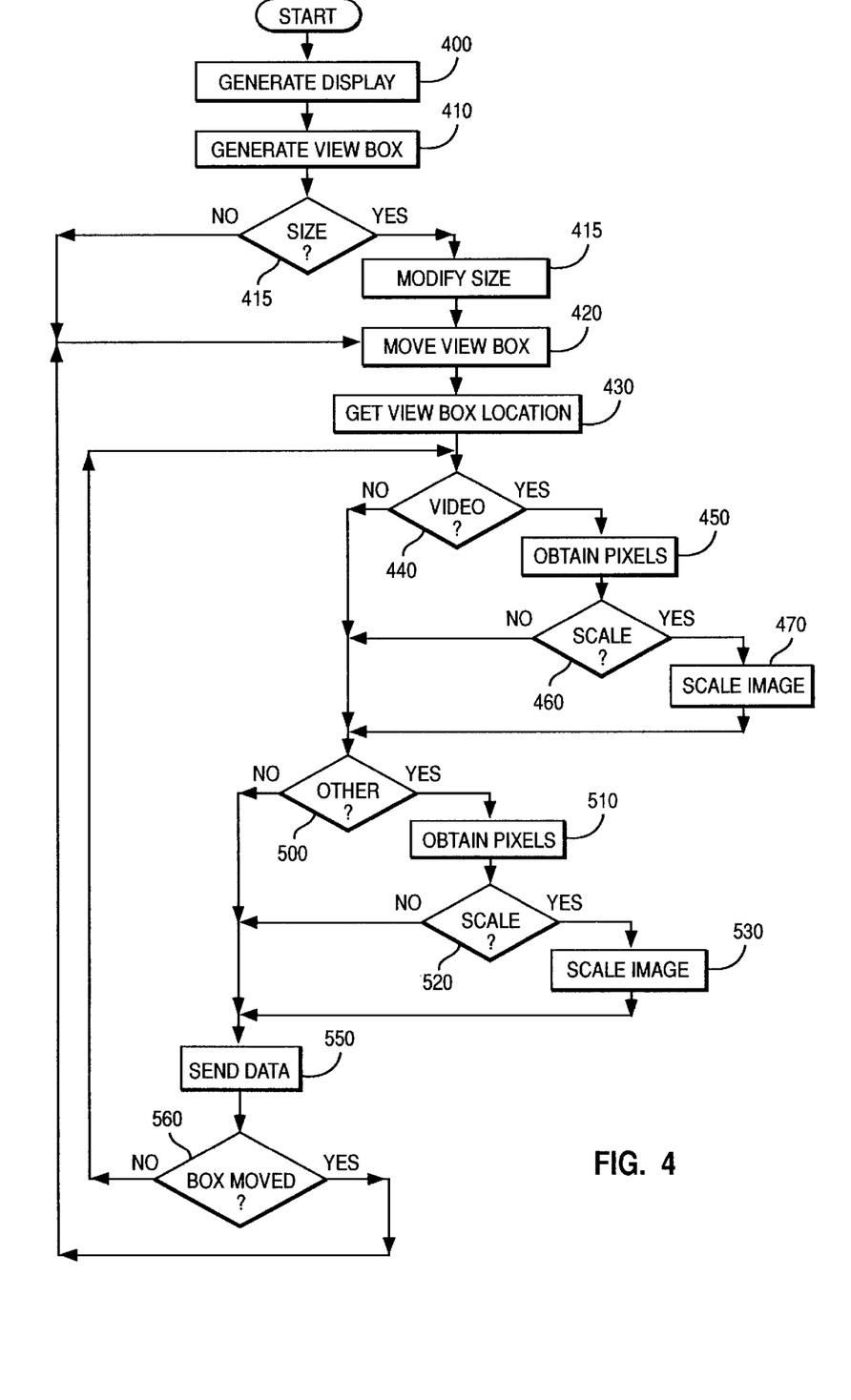
FIG. 4 is a flow diagram illustrating the use of the view box to generate an image sent a remote user.

FIG. 4 is a flow diagram illustrating the use of the view box to generate an image sent a remote user. In a first step 400, the user generates various desired windows on a display such as shown in FIGS. 3A–3D. Please note that in the preferred embodiment of the invention, the windows may be moved and new windows may be opened at anytime during the below process to modify the desired output.

In step 410, the user generates the view box for use in determining what image is transmitted to the remote user. In the preferred embodiment, the view box is originally generated by the use of a pull down menu followed by using the mouse to click the upper left hand corner of the desired view box window. In the preferred embodiment, the view box is a preset size to prevent the need to magnify or shrink the image prior to sending it to the remote user. However, in step 415, the user may then select the capability to modify the size of the view box, thereby typically causing the need for shrinking or magnifying the image prior to sending it to the remote user, followed in step 416 by clicking with the mouse the lower right hand corner of the desired view box window. This sets the original location of the view box.

In step 420, the user may then move the view box using well known click and drag techniques. In step 430, the system then obtains the location of the view box for determining what portions of the display are covered.

In step 440, it is determined whether the view box covers a portion or all of the video image. If so, then the main processor may be involved with some of the processing of the data in the preferred embodiment. In step 450, the main processor obtains the appropriate pixels directly from the video adapter as they are generated. This includes all pixels within the view box that are also within the video image window. Then in step 460, the main processor determines whether the video signal needs to be magnified or shrunk based on the size of the view box selected by the user above and/or depending upon how the video signal is provided by the video adapter (the image may have already been shrunk for display on the local display). If yes in step 460, then in step 470, the main processor will magnify or shrink the video image or may use the graphics processor to do so and the proceeds on to step 500.

In step 500, it is determined whether any data besides video image data from the video adapter is within the view box. If yes, then in step 510, the appropriate pixels are obtained from the graphics frame buffer (other than video data from the video adapter). In the preferred embodiment, the pixel data is obtained and processed by the graphics processor which has quicker and closer access to the frame buffer data. In step 520, the graphics processor determines whether the frame buffer pixels need to be magnified or shrunk based on the size of the view box selected by the user above. If yes in step 520, then in step 530, the graphics processor will magnify or shrink the video image or may use the graphics processor to do so and the proceeds on to step 550.

In step 550, the data accumulated for the present frame is then sent to the remote use for display by the communications adapter. Processing then continues to step 560 where it is determined whether the user intends to move the view box. If not, then processing continues to step 440 to generate the next frame of data. Otherwise, processing continues to step 420 for moving the view box.

Of course, many of the above steps may be performed in parallel such as the steps of obtaining the video pixels and the steps to obtain the other types of pixels from the frame buffer.

There are many advantages to the present invention. For example, the user has great flexibility to determine what displayed information to provide to a remote user. In addition, the present invention is flexible to handle many types of displayed data other than video data by using the techniques described above.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An apparatus for selecting portions of a displayed image for remote display comprising:
    means for displaying an image;
    means for selecting a portion of the displayed image, said selecting means including means for moving and sizing a view box over said displayed image wherein said portion of said displayed image is determined by size and location of said view box; and
    means for communicating the selected portion of the image for display on a remote display.

2. The apparatus of claim 1 wherein the means for displaying includes means for displaying a video image and a graphical image concurrently.

3. The apparatus of claim 2 wherein the means for selecting includes means for selecting a portion of the video image and a portion of the graphical image.

4. The apparatus of claim 3 wherein the means for communicating includes means for communicating the selected portion of the video image and the selected portion of the graphical image for concurrent display on the remote display.

5. The apparatus of claim 4 further comprising means for concurrently displaying on the remote display the selected portion of the video image and the selected portion of the graphical image.

6. A method for selecting portions of a displayed image for remote display comprising the steps of:
    displaying an image;
    selecting a portion of the displayed image, said selecting step including the step of moving and sizing a view box over said displayed image wherein said portion of said displayed image is determined by size and location of said view box; and
    communicating the selected portion of the image for display on a remote display.

7. The method of claim 6 wherein the step of displaying includes displaying a video image and a graphical image concurrently.

8. The method of claim 7 wherein the step of selecting includes selecting a portion of the video image and a portion of the graphical image.

9. The method of claim 8 wherein the step of communicating includes communicating the selected portion of the video image and the selected portion of the graphical image for concurrent display on the remote display.

10. The method of claim 9 further comprising concurrently displaying on the remote display the selected portion of the video image and the selected portion of the graphical image.

11. A data processing system for processing data comprising:
    a memory for storing data for processing;
    a processor coupled to memory for processing stored data; and
    an apparatus coupled to said processor for selecting portions of a displayed image for remote display including:
        i) means for displaying an image;
        ii) means for selecting a portion of the displayed image, said selecting means including means for moving and sizing a view box over said displayed image wherein said portion of said displayed image is determined by size and location of said view box; and
        iii) means for communicating the selected portion of the image for display on a remote display.

12. The data processing system of claim 11 wherein the means for displaying includes means for displaying a video image and a graphical image concurrently.

13. The data processing system of claim 12 wherein the means for selecting includes means for selecting a portion of the video image and a portion of the graphical image.

14. The data processing system of claim 13 wherein the means for communicating includes means for communicating the selected portion of the video image and the selected portion of the graphical image for concurrent display on the remote display.

15. The data processing system of claim 14 further comprises means for concurrently displaying on the remote display the selected portion of the video image and the selected portion of the graphical image.

16. A computer program product stored on a computer readable medium for selecting portions of a displayed image for remote display comprising:
    means for displaying an image;
    means for selecting a portion of the displayed first image, said selecting means including means for moving and sizing a view box over said displayed image wherein said portion of the displayed image is determined by size and location of said view box; and
    means for communicating the selected portion of the image for display on a remote display.

17. The computer program product of claim 16 wherein the means for displaying includes means for displaying a video image and a graphical image concurrently.

18. The computer program product of claim 17 wherein the means for selecting includes means for selecting a portion of the video image and a portion of the graphical image.

19. The computer program product of claim 18 wherein the means for communicating includes means for communicating the selected portion of the video image and the selected portion of the graphical image for concurrent display on the remote display.

20. The computer program product of claim 19 further comprising means for concurrently displaying on the remote display the selected portion of the video image and the selected portion of the graphical image.

* * * * *